Sept. 15, 1925.                                                          1,553,388
                              F. MAHOOD
              SIDE CURTAIN FOR AUTOMOBILES OR OTHER VEHICLES
                     Filed March 16, 1925        2 Sheets-Sheet 1
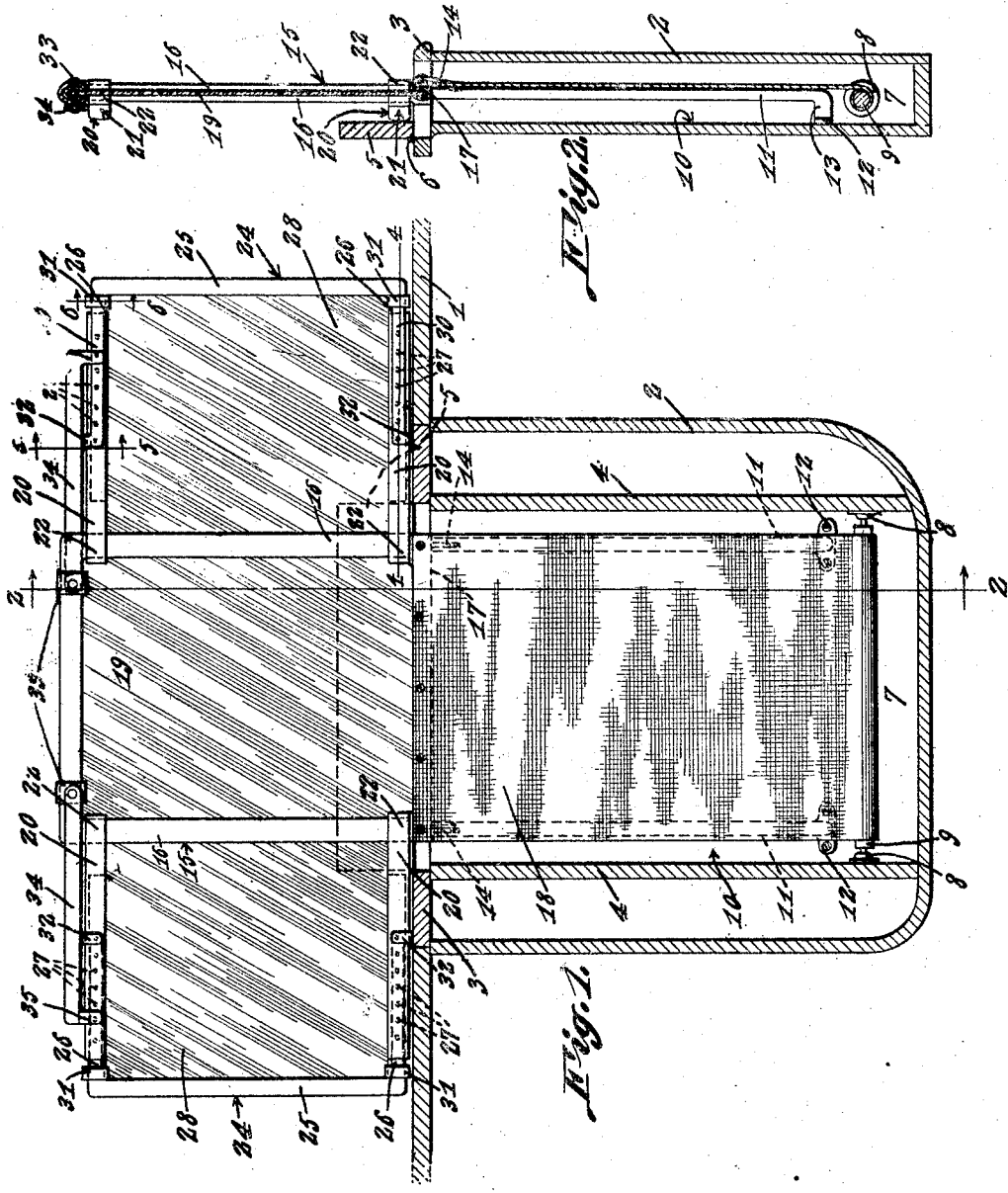
Frank Mahood, INVENTOR.
BY
Geo. P. Kimmel  ATTORNEY.

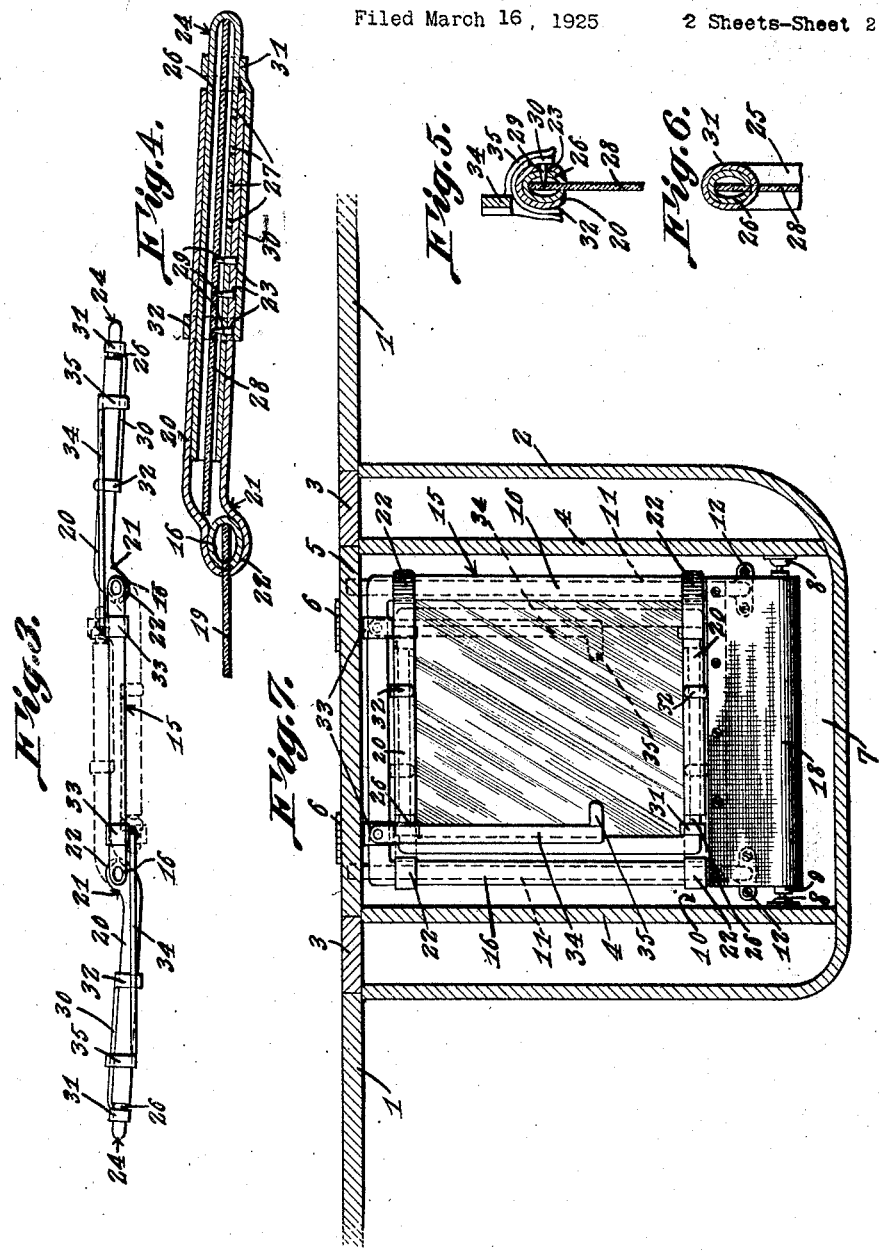

Patented Sept. 15, 1925.

1,553,388

UNITED STATES PATENT OFFICE.

FRANK MAHOOD, OF AMITY, OREGON.

SIDE CURTAIN FOR AUTOMOBILES OR OTHER VEHICLES.

Application filed March 16, 1925. Serial No. 15,844.

*To all whom it may concern:*

Be it known that I, FRANK MAHOOD, a citizen of the United States, residing at Amity, in the county of Polk and State of Oregon, have invented certain new and useful Improvements in Side Curtains for Automobiles or Other Vehicles, of which the following is a specification.

This invention relates to side curtains for automobiles or other vehicles, and has for its primary object the provision, in a manner as hereinafter set forth, of a side curtain which is foldable and adapted to be stored in the side of the body of the vehicle where it is retained in position ready for instant use.

Another object of the invention is the provision, in a manner as hereinafter set forth, of automobile side curtains in permanent connection with the tonneau of the machine and adapted to be drawn therefrom and opened out to close the sides thereof.

Still another object of the invention is the provision, in a manner as hereinafter set forth, of automobile side curtains having adjustable means whereby light of glass or mica of various sizes may be placed in position to suit bodies of different lengths.

A further and final object of the invention is the provision, in a manner as hereinafter set forth, of automobile side curtains adapted to be folded and stored in the door of the body through the top thereof and further being of simple construction, easy and quick to set up into position, light but strong and durable, presenting a neat appearance when set up and entirely concealed from view when taken down, and inexpensive to manufacture and install.

The invention will be best understood from a consideration of the following detailed description taken in connection with the accompanying drawing, with the understanding that the invention is not confined to any strict conformity with the showing in the drawings, but may be changed and modified so long as such changes and modifications mark no material departure from the salient features of the invention as expressed in the appended claims.

In the drawings:

Figure 1 is a view of the inner side of the curtains embodying this invention, as set up in position, and showing the door in which they are adapted to be stored, in section to set forth the interior of the construction thereof.

Figure 2 is a vertical section taken upon the line 2—2 of Figure 1.

Figure 3 is a top plan view of the curtain section when in opened out position.

Figure 4 is a horizontal section taken upon the line 4—4 of Figure 1.

Figure 5 is a section upon the line 5—5 of Figure 1.

Figure 6 is a section upon the line 6—6 of Figure 1, and,

Figure 7 is a sectional view of the door in which the curtains are adapted to be stored, showing the curtains in folded position and housed within the door.

Referring now to the drawings in detail, wherein like numerals of reference indicate corresponding parts throughout the several views, the numeral 1 indicates a portion of an automobile body and the numeral 2 indicates a door in the body having the usual top or sill 3.

The door 2 has placed therein the spaced vertical aligned posts 4, the use of which will become apparent as the description proceeds, and the top or sill 3 of the door has its central portion cut out to provide the closure 5 which is pivotally secured longitudinally at one side by means of the hinges 6, to the sill 3. This closure 5, as shown, swings upwardly to uncover or open the space 7 formed in the door between the upright posts 4.

Secured upon the opposed inner faces of the posts 4 are roller bracket members 8 supporting therebetween a spring roller 9, one end of which is connected to a spiral spring in the same manner as a window shade roller, and as shown, this roller is pivotally secured between the posts 4 adjacent their lower ends in the lower portion of the compartment 7.

Secured upon the inner face of the outer wall 10 of the door is a pair of spaced vertically extending rods or standards 11, the lower end of each standard being turned outwardly to provide ears 12, which ears are secured to the outer side 10 of the door, as shown in Figures 1 and 7, and as is also shown, these standards are positioned one adjacent each of the posts 4 and have their lower ends inturned, as indicated at 13, whereby the standards will be caused to extend upwardly through the central portion of the compartment 7. The upper ends of the standards are, when the hinged cover 5 is down, engaged in the under face of the cover 5, as shown in Figure 7, and each of the standards has recessed in the wall thereof at a point just below the cover 5 a spring latch 14, the purpose of which will be disclosed in the preceding description.

Mounted for vertical reciprocation upon the spaced standards 11 is a tubular frame, indicated as a whole by the numeral 15. This frame 15 has the standards 11 extended through the vertical side rails 16 thereof and secured across one face of the lower cross rail 17 of this frame is one end of a canvas apron 18, the other end of which is secured to and adapted to be wound about the spring roller 9, which is pivoted between the brackets 8 in the lower portion of the compartment 7. It will thus be seen that when the frame 15 is drawn upwardly upon the standards 11, out of the compartment 7, the canvas apron 18 will be unwound from the roller 9 placing the spring therein under tension so that when the frame is replaced in the compartment 7, the spring roller will wind up the canvas 18 and draw the frame downwardly upon the standards or guide rods 11. This frame 15 has secured therein a light of glass or mica, as indicated at 19.

The tubular side rails 16 of the frame 15 slide over the latch members 14 recessed in the upper ends of each of the standards 11 and when the frame 15 is drawn to the limit of its upward movement, the lower ends of the side rails 16 will be moved above the latch members whereupon the same will spring outwardly and serve to support the frame 15 in vertical position above the top 3 of the door, as shown in Figure 2.

Extending laterally from each side of the frame 15 and at the top and bottom thereof, is an arm member 20, these arms 20 being tubular and open at their outer ends and each further having its inner end obtusely angled, as at 21, and terminating in a loop 22 which fits about the adjacent side rail 16 of the frame 15. These looped portions 22 are made of spring or resilient metal so that when the arms 20 are revolved upon the side rails 16 they will expand and contract to allow the arm to be swung therearound, as the side rails 16, are of oval cross section, as shown in Figure 4. It will be noted upon reference to Figure 3 that the angled portions 21 of the arms 20, upon one side of the frame 15 extend outwardly from one face of the frame and the arms upon the opposite side thereof extend outwardly from the opposite face of the frame, thus when the arms 20 on both sides of the frame are swung in across the faces of the frame 15, they will fit snugly against the faces of the frame, thus setting up the structure in compactly folded condition.

Each of the arms 20 has a longitudinally extending series of apertures on its inner side as at 23.

Connecting the outer ends of each pair of arms 20 upon each side of the frame 15, is an open or three-sided frame, indicated as a whole by the numeral 24. These frames comprise the vertical outer portion 25 and the inwardly extending top and bottom portions 26. These top and bottom portions each extend into a tubular arm 20 as shown in Figure 4 and the outer side 25 thus connects the ends of the superposed tubular arms 20. The inwardly extending horizontal top and bottom portions 26 of the open frames 24 each has its inner face provided with a longitudinally extending series of apertures 27, these apertures being adapted to aline with the apertures 23 in the tubular arm 20. The open frame 24 carries a light of mica or celluloid, and the top and bottom members 26 of the open frames 24 are adjustably shifted in or out of the arms 20 to fit the same to the machine upon which the curtains are to be used, and the lights 28 of mica or celluloid carried by the frames 24 are then held rigidly in position by means of the pins 29 which are carried by the bar member 30, being extended through the aligned apertures 23 and 27 and into the mica or celluloid lights to hold the same in position as stated. These bars 23, there being one extending along the inner face of each of the arms 20, has at its outer end a loop 31, which is secured about a rail 26 and further has at its inner end the clip member 32 which resiliently engages over the arm 20. Thus it will be seen that the open frame 24 can be moved in or out to increase or decrease the size of the windows on either side of the frame 15, and when properly adjusted the pins 29 carried upon the bar 30 are pressed through the apertures 23 and 27 to engage the celluloid or mica window lights to hold the same in position, and the clip 32 will act to retain the frame 24 and the light 28 in proper position.

Secured about the top cross rail of the frame 15 is a pair of bands 33 located as shown, one adjacent each of the side rails 16. Pivotally secured to each of these bands 33 is a brace arm 34, each of which when extended laterally from its adjacent side of the frame, has its free end extended to a position over and adjacent the outer end of a top one of the arms 20, and the outer end of each of the brace arms 34 is provided with a clip yoke 35, which clips over the adjacent arm 20 and holds the arm and the window frame connected therewith, in rigid extended position with respect to the central frame or window 15.

The side curtain structure just described may be one of a set of four or more used in connection with an automobile body, one set being housed in each of the doors of the body. When it is desired to place the curtains in position for enclosing the machine, the lid 5 is swung upwardly and the frame 15 drawn vertically from the compartment 7 upon the guide bars or rods 11. As before stated, when the frame has reached the limit of its upward movement, the spring clips will move outwardly to engage under the ends of the frame and thus support the same in vertical position above the top of the door. The side wings or lights are then swung outwardly from their respective positions across each face of the frame 15, to which they had been folded when the curtains were stored away, and when swung outwardly to extend laterally from each side of the frame, as indicated in Figure 2, the brace rod 34 is swung upwardly upon its pivot and the clip yoke 35 engaged over the tubular arm or bar 20 at the top of the frame. Thus the side frames are held in laterally projected positions with respect to the central frames, and the side bar 25 of one of the frames 24 is adapted to abut the side bar of an adjacent similar frame forming a part of a similar curtain structure carried by the other door upon that side of the vehicle, to completely enclose the vehicle upon one side. It is of course apparent from this that two of these sets of side curtains are necessary upon each side of the vehicle to completely enclose the same. As shown in Figure 1, the upper portion of the curtain set extends upwardly beyond the lower edge of the body top, thus completely closing the same about the upper portion thereof.

From the foregoing description it will be readily seen that there has been provided a novel and unique side curtain structure which is easily handled, quickly placed in position when wanted or as quickly folded and restored in its respective compartment when not wanted.

Having thus described my invention what I claim is:

1. An automobile side curtain comprising, in combination with means to provide an upwardly opening compartment in the side of a vehicle body, vertical spaced guide bars in said compartment, a main window frame vertically shiftable on said bars into or out of said compartment, a swinging window pivotally connected to each side of said frame to fold across one face thereof for the storage of said curtains in the compartment, and brace means extending from said frame for removably holding said swinging windows in open position when the device is removed from the compartment.

2. An automobile side curtain comprising, in combination with means to provide an upwardly opening compartment in the side of a vehicle body, vertical spaced guide bars in said compartment, a main window frame vertically shiftable on said bars into or out of said compartment, a swinging window pivotally connected to each side of said frame to fold across one face thereof for the storage of said curtains in the compartment, brace means extending from said frame for removably holding said swinging windows in open position when the device is removed from the compartment, and means under tension, normally acting to draw said curtain, when folded, into the compartment.

3. An automobile side curtain comprising, in combination with means to provide an upwardly opening compartment in the side of a vehicle body, vertical spaced guide bars in said compartment, a main window frame vertically shiftable on said bars into or out of said compartment, and a swinging window pivotally connected to each side of said frame to fold across one face thereof for the storage of said curtains in the compartment, said windows having adjustable frames adapting them to be increased or decreased in size to fit the curtain structure to automobile bodies of different lengths.

4. An automobile side curtain comprising, in combination with means to provide an upwardly opening compartment in the side of a vehicle body, vertical spaced guide bars in said compartment, a main window frame vertically shiftable on said bars into or out of said compartment, a pair of tubular arms pivotally carried upon each side of said frame, one at the top and the other at the bottom thereof, a three sided open frame having a vertical outer side, and horizontal top and bottom members, associated with each pair of arms, said top and bottom members each slidably engaged in an arm, and means extending from said main frame and engaging said other frames to retain the same in extended position, when the curtain is opened out, said side frames and the adjacent carrying arms being foldable across the faces of the main frame for housing the curtain structure in said compartment.

5. An automobile side curtain comprising, in combination with means to provide an upwardly opening compartment in the side of a vehicle body, vertical spaced guide bars in said compartment, a main window frame vertically shiftable on said bars into or out of said compartment, a pair of tubular arms pivotally carried upon each side of said frame, one at the top and the other at the bottom thereof, a three sided open frame having a vertical outer side, and horizontal top and bottom members associated with each pair of arms, said top and bottom members each slidably engaged in an arm, means extending from said main frame and engaging said other frames to retain the same in extended position, when the curtain is opened out, said side frames and the adjacent carrying arms being foldable across the faces of the main frame for housing the curtain structure in said compartment, and means carried by said three sided frames and extending through the surrounding tubular arm, whereby said frames and arms may be retained in adjusted position.

In testimony whereof, I affix my signature hereto.

FRANK MAHOOD.